United States Patent
Hung et al.

(10) Patent No.: US 10,922,071 B2
(45) Date of Patent: Feb. 16, 2021

(54) CENTRALIZED OFF-BOARD FLASH MEMORY FOR SERVER DEVICES

(71) Applicant: QUANTA COMPUTER INC., Taoyuan (TW)

(72) Inventors: Ming-Hung Hung, Taoyuan (TW); Hsin-Hung Kuo, Taoyuan (TW); Chin-Fu Ou, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 93 days.

(21) Appl. No.: 16/352,454

(22) Filed: Mar. 13, 2019

(65) Prior Publication Data

US 2020/0293306 A1 Sep. 17, 2020

(51) Int. Cl.
| | | |
|---|---|---|
| *G06F 9/00* | (2006.01) | |
| *G06F 15/177* | (2006.01) | |
| *G06F 8/654* | (2018.01) | |
| *G06F 3/06* | (2006.01) | |
| *G06F 8/61* | (2018.01) | |
| *G06F 11/14* | (2006.01) | |

(52) U.S. Cl.
CPC ............ *G06F 8/654* (2018.02); *G06F 3/0604* (2013.01); *G06F 3/0634* (2013.01); *G06F 3/0658* (2013.01); *G06F 3/0679* (2013.01); *G06F 8/63* (2013.01); *G06F 11/1464* (2013.01)

(58) Field of Classification Search
None
See application file for complete search history.

(56) References Cited

U.S. PATENT DOCUMENTS

| 9,807,156 | B2 | 10/2017 | Johnson | |
|---|---|---|---|---|
| 10,303,646 | B2 | 5/2019 | Das et al. | |
| 2003/0033466 | A1* | 2/2003 | Larson | G06F 11/0751 710/305 |
| 2005/0080887 | A1 | 4/2005 | Lee et al. | |
| 2006/0155982 | A1* | 7/2006 | Christensen | H04L 49/254 713/153 |
| 2011/0035540 | A1 | 2/2011 | Fitzgerald et al. | |

(Continued)

FOREIGN PATENT DOCUMENTS

| CN | 107646105 A | 1/2018 |
|---|---|---|
| CN | 108780406 A | 11/2018 |

(Continued)

OTHER PUBLICATIONS

Partial European Search Report for EP Application No. 19188956.7, dated Mar. 5, 2020.

*Primary Examiner* — Nitin C Patel
(74) *Attorney, Agent, or Firm* — Nixon Peabody LLP (57) ABSTRACT

A centralized flash memory module is provided. The centralized flash memory module includes flash memory components, a flash memory management controller (FMMC), and a complex programmable logic device (CPLD). Each of the flash memory components is connected to a server device separate from the centralized flash memory module. The FMMC is configured to connect to the flash memory components and to a rack management device, separate from the centralized flash memory module. The CPLD is configured to connect the FMMC to the flash memory components and connect the server device to the flash memory components.

13 Claims, 6 Drawing Sheets

(56) References Cited

U.S. PATENT DOCUMENTS

2013/0325998 A1    12/2013    Hormuth et al.
2018/0253131 A1    9/2018     Heinrich et al.
2019/0102293 A1*   4/2019     Li ............................ G06F 3/06

FOREIGN PATENT DOCUMENTS

TW        200511757 A     3/2005
TW          M422693 U     2/2012

* cited by examiner

CENTRALIZED OFF-BOARD FLASH MEMORY FOR SERVER DEVICES

FIELD OF THE INVENTION

The present disclosure generally relates to flash memory storage systems in a rack server system. Specifically, the present disclosure relates to a centralized flash memory module, and associated methods of booting and firmware update, recovery, and backup.

BACKGROUND

When a server is power cycled, the first action taken by a central processing unit (CPU) is to send a message to activate the Basic Input and Output System (BIOS). The BIOS then runs a series of tests, called the POST (Power On Self-Test), to verify if the system devices are working correctly. The BIOS enables the essential functions for the server to operate. If the BIOS is corrupted, the CPU cannot function. However, a typical BIOS can restore a valid BIOS image in the event that it becomes corrupt. This is accomplished by storing a recovery program in a flash memory that is not in-system writable. This ensures the recovery program cannot be corrupted. The recovery program is usually a simple code that has the ability to initialize minimal system hardware to retrieve a new code image from a flash drive or other removable media. This power cycle and restore function also is required for the firmware for other controllers, such as baseboard management controllers or memory switch controllers.

SUMMARY

A centralized flash memory module is provided. The centralized flash memory module includes flash memory components, a flash memory management controller (FMMC), and a complex programmable logic device (CPLD). Each of the flash memory components is connected to a server device. The server device is separate from the centralized flash memory module. The FMMC is configured to connect to the flash memory components and to a rack management device. The rack management device is also separate from the centralized flash memory module. The CPLD is configured to connect the FMMC to the flash memory components. The CPLD is also configured to connect the server device to the flash memory components.

In some embodiments, the centralized flash memory module can also include a non-volatile storage device configured to store a routing table. The routing table can include a topology of the flash components and the server device. The FMMC can be configured to send the routing table to the rack management device. In some embodiments, each of the flash memory components includes a golden image for recovery purposes.

A server system is also provided. The server system includes a rack device housing server devices, a rack management device stored on the rack device, and a centralized flash memory module connected to each of the server devices. As described above, the centralized flash memory module includes flash memory components, a flash memory management controller (FMMC), and a complex programmable logic device (CPLD).

In some embodiments, the centralized flash memory module is located on the rack device. In alternative embodiments, the centralized flash memory module is located in a cloud based server device. Each of the flash memory components can include a golden image for recovery purposes for two or more rack devices.

A server system is also provided. The server system includes a rack device housing server devices; a rack management device stored on the rack device; a centralized flash memory module connected to each of the server devices; a flash memory management controller (FMMC); and a complex programmable logic device (CPLD). The centralized flash memory module can include flash memory components. Each of the flash memory components is connected to the server devices. The FMMC is configured to connect to the flash memory components and to the rack management device. The rack management device is separate from the centralized flash memory module. The CPLD is configured to connect the FMMC to the flash memory components, and connect the server device to the flash memory components. In some embodiments, the centralized flash memory module is located in a cloud based server device.

A method of updating flash firmware image of flash memory components is also provided. The method includes validating the flash firmware image and updating the flash memory components to replace a first flash firmware image with the validated flash firmware image. The flash memory components are stored in a centralized flash memory module. Upon determining success of the first updating, the flash memory components are updated to replace a second flash firmware image with the validated flash firmware image. The second flash firmware image is associated with a golden flash image. The method also includes using a flash memory management controller to identify flash memory components that successfully replaced the second flash firmware image. The server device connected to the flash memory components is powered on.

A method of booting a flash firmware image of a flash memory component is also provided. The method includes invalidating the flash firmware image of the flash memory component. The flash memory component is stored in a centralized flash memory module among other flash memory components. The method includes performing a recovery of the flash firmware image using a golden flash image stored in a second flash memory component. The method also includes receiving a command from a flash memory management controller to power cycle a server device connected to the flash memory component. The server device is power cycled.

Additional features and advantages of the disclosure will be set forth in the description that follows, and in part, will be obvious from the description, or can be learned by practice of the principles disclosed herein. The features and advantages of the disclosure can be realized and obtained by means of the instruments and combinations particularly pointed out in the appended claims. These and other features of the disclosure will become fully apparent from the following description and appended claims, or can be learned by the practice of the principles set forth herein.

BRIEF DESCRIPTION OF THE DRAWINGS

In order to describe the manner in which the above-recited disclosure and its advantages and features can be obtained, a more particular description of the principles described above will be rendered by reference to specific examples illustrated in the appended drawings. These drawings depict only example aspects of the disclosure, and are therefore not to be considered as limiting of its scope. These principles are described and explained with additional specificity and detail through the use of the following drawings.

DETAILED DESCRIPTION

The present invention is described with reference to the attached figures, where like reference numerals are used throughout the figures to designate similar or equivalent elements. The figures are not drawn to scale, and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details, or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

Figure 1:
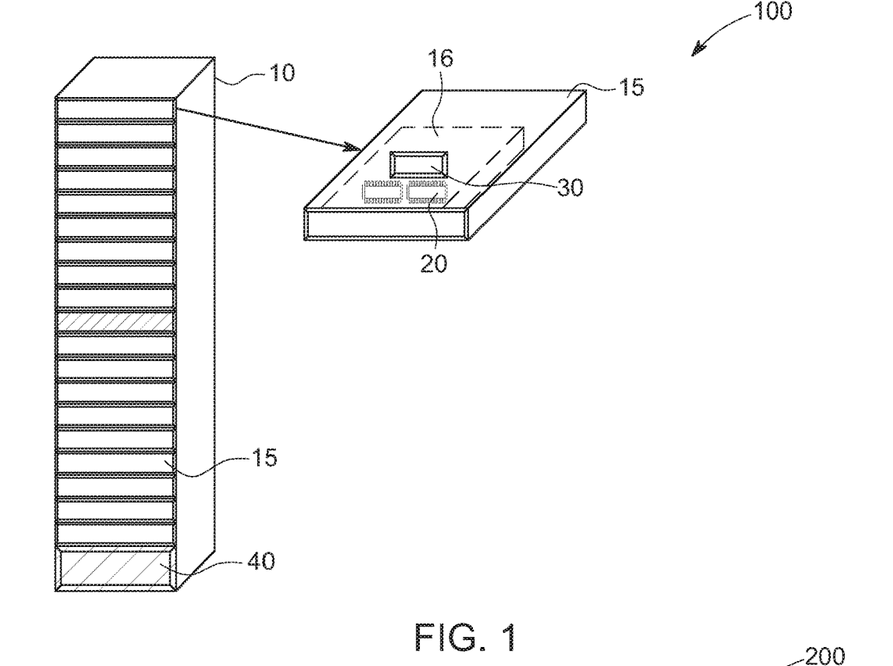
FIG. 1 illustrates a traditional server system, as generally known in the prior art.

FIG. 1 illustrates a traditional server system 100, as generally known in the prior art. The server system 100 can include server devices 15 housed on a rack device 10. Each server device 15 typically includes a Flash memory management controller (FMMC) 30 and multiple flash devices 20. The flash device 20 is typically mounted on a motherboard 16. The flash device 20 is typically not connected to the rack management device 40. As a result, performing a recovery of a flash device 20 becomes challenging as most technicians interface directly with the rack management 40, as explained below.

In order to replace a failed flash device 20, a technician must open a chassis of the server device 15 and physically replace the flash device 20. To alleviate the burden of potentially physically replacing countless flash devices 20 in a data center of thousands of rack devices 10, a second flash device 20 is typically stored in the same server device 15. Therefore, once the first flash device 20 is broken, the second flash device 20 can be activated to recover the broke device. In other words, a technician needs to erase all firmware and remove the chip information manually before scrapping the flash device 20 to prevent leaking any potentially sensitive information.

Each server device 15 is secured to ensure that only authorized users are accessing the contents of the device. The common practice to secure the flash devices 20 is to rely on a Unified Extensible Firmware Interface (UEFI) secure boot or secure flash to establish the trust chain. Furthermore, an Application-Specific Integrated Circuit (ASIC) can also be implemented for each server device 15 to monitor the activity of the flash device 20, and authenticate access before read, write, or execute commands are executed. In other words, in order to implement advanced security on top of current trust chain, another ASIC needs to be implemented to monitor the activity of the flash device 20, or compare the content of both flash devices 20 on the server device 15 before approving a next action.

Figure 2:
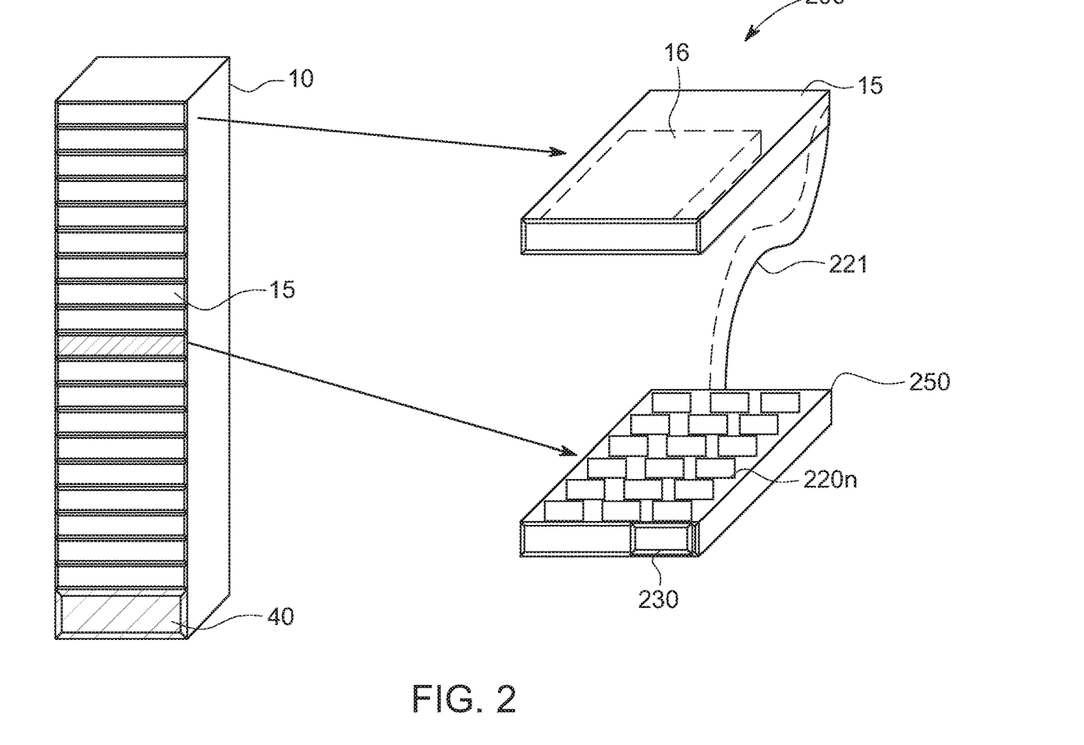
FIG. 2 illustrates an exemplary server system, in accordance with an implementation of the disclosure.

The present embodiment provides a unique solution to the cumbersome processes associated with the server system 100. FIG. 2 illustrates an exemplary server system, in accordance with an implementation of the disclosure.

As illustrated, the flash devices 220 for each server device 15 of the rack device 10 is stored on a centralized flash memory module (CFMM) 250. A single flash memory management controller (FMMC) 230 can also be stored on the CFMM 250. Each of the flash devices 220 are connected to a server device 15 by connection 221. In this embodiment, a faulty flash device can be repaired at a central location. Because the flash device 220 is no longer located on the motherboard 16, the motherboard can be scrapped directly without additional security measures. Each flash device 220 in the CFMM 250 is designed to be reusable for other server devices 15 in the rack device 10. A single FMMC 230 is needed to manage all of the flash devices 220. In addition, each functioning flash device 220 can be perceived as a golden image (not shown) for a faulty flash device, thereby eliminating the need for dual flash devices in each server device 15.

In some embodiments, the CFMM 250 can be implemented as just a box similar to a network switch in the rack device 10. Moreover, the CFMM 250 can be implemented as a hot-plug module for one or more server devices 15. The transfer interface can include a cable or a wireless connection to connect to the FMMC 230. Therefore, the FMMC 230 can perform the recovery and security authentication before endorsing the flash device 220 to be bootable or writable.

In the disclosed embodiment, the flash devices 220 are not occupying space on the motherboard 16 of the server device 15. Instead, the flash device 220 is connected to the server device 15 by way of a cable, connector or wireless connection 221. Furthermore, each server device 15 no longer needs dual flash devices for auto-recovery purposes.

Figure 3:
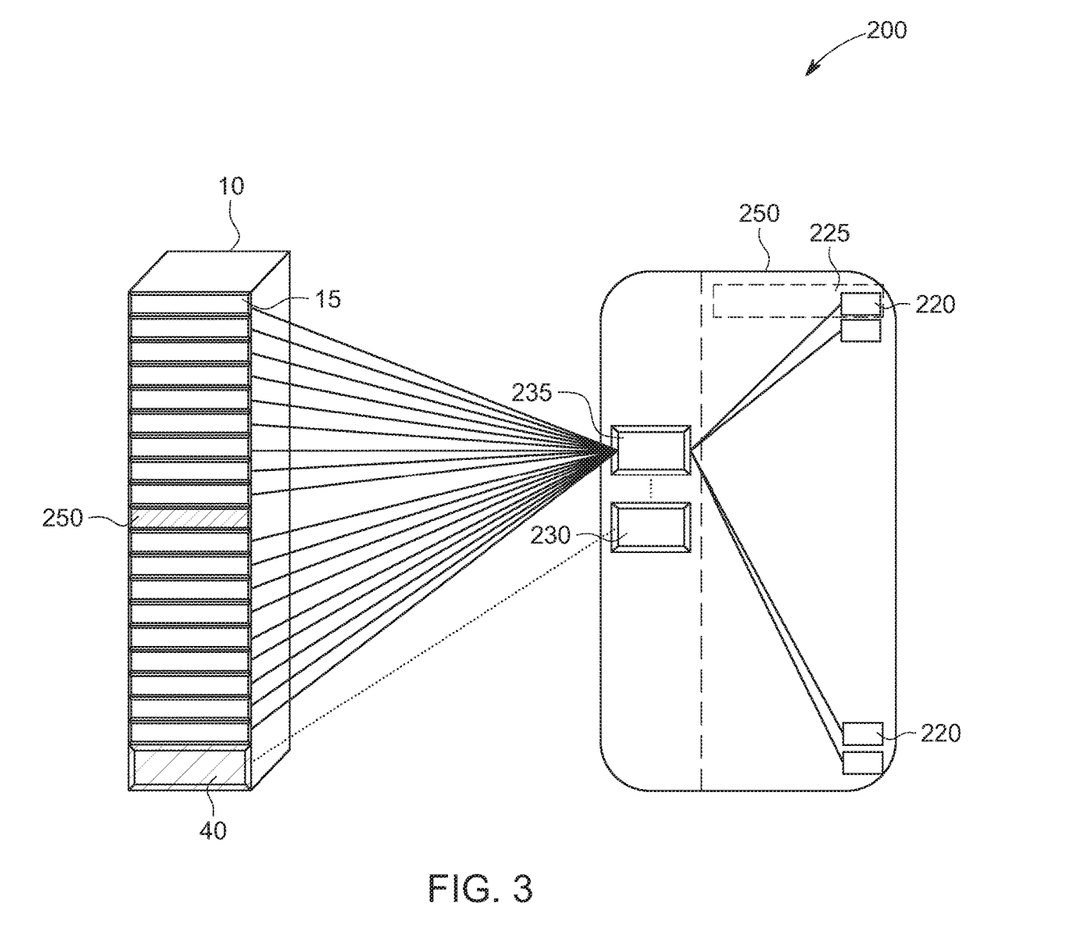
FIG. 3 illustrates a centralized flash memory module, in accordance with an implementation of the disclosure.

FIG. 3 illustrates the topology of the CFMM 250 in a server system 200, in accordance with an implementation of the disclosure. It should be understood that the topology refers to the mapping of connections between server devices. The topology of the flash devices 220 and each server device 15 can be configured solely through the FMMC 230. Alternatively, an auxiliary device such as a Complex Programmable Logic Device (CPLD) 235 can be implemented in the CFMM 250 to manage the topology, as shown herein. A routing table (not shown) can be stored in a non-volatile storage device (not shown) to manage the topology across power cycles.

If the topology of the flash devices 220 and each server device 15 is changed, the routing table can be sent to the rack management device 40. The rack management device 40 can control the power state for the server devices 15. The rack management device 40 can also reference the routing table to determine which server device 15 is online/offline and any associated error messages. Therefore, the rack management device 40 can provide an indicator (e.g., 'Flash memory offline') to a technician for repair.

The CFMM 250 can be mounted in the rack device 10 in some embodiments, to service all of the server devices 15 in the rack device 10. In alternative embodiments, the CFMM 250 can be located remote from the rack device 10, to service multiple rack devices 10 in a data center. A single flash device 220 on the CFMM 250 can be implemented as a golden image 225. Alternatively, the FMMC 230 can copy a golden image from any sever device 15 and update the faulty flash device 220 on the CFMM 250.

Figure 4:
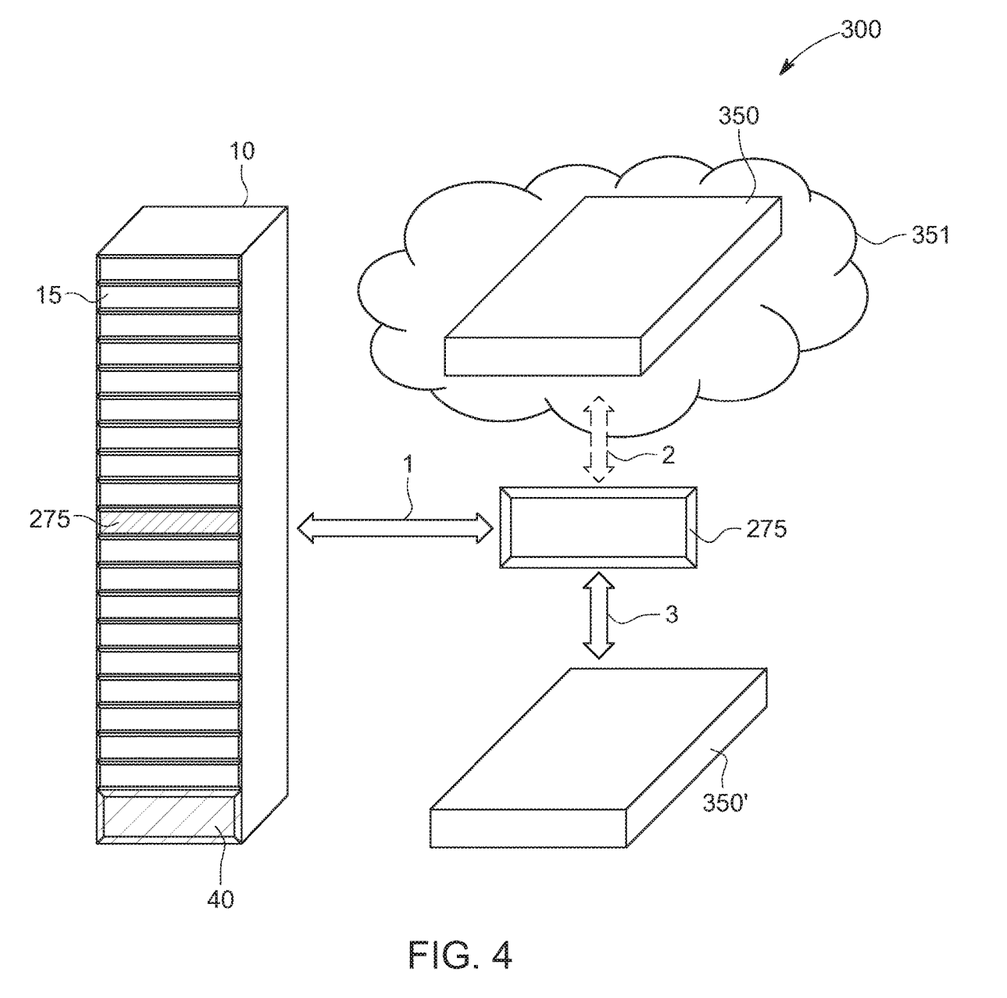
FIG. 4 illustrates exemplary locations of the centralized flash memory module in the exemplary server system, in accordance with an implementation of the disclosure.

FIG. 4 illustrates exemplary locations of the CFMM in an exemplary server system 300, in accordance with an implementation of the disclosure. The CFMM 350' can be local with respect to the rack device 10 (Local FMM). Alternatively, the CFMM 350 can be virtual with respect to the rack device 10 (Remote CFMM). In the case where the virtual CFMM 350 is implemented, a local CPLD+FMMC 275 can be implemented to deploy firmware images on behalf of the CFMM 250 (in FIG. 3). In some embodiments, the CPLD+FMMC 275 can be wirelessly connected to the CFMM 350 in a cloud based host server 351. Alternatively, the CFMM 350 can be configured as a cloud based host server. The data in the virtual CFMM 350 and the local CFMM 350' can be shared and managed by the CPLD+FMMC 275. In this way, the server system 300 can boot without the virtual CFMM 350 if the local CFMM 350' will suffice.

In some embodiments, the virtual CFMM 350 is not limited to a single rack device 10. The virtual CFMM 350 can be routed to any rack device 10, as long as the server device 15 installed on the rack device 10 is running the same firmware. Furthermore, the golden image 225 can also be shared to all rack devices and their server devices 15 that's running the same firmware.

Figure 5:
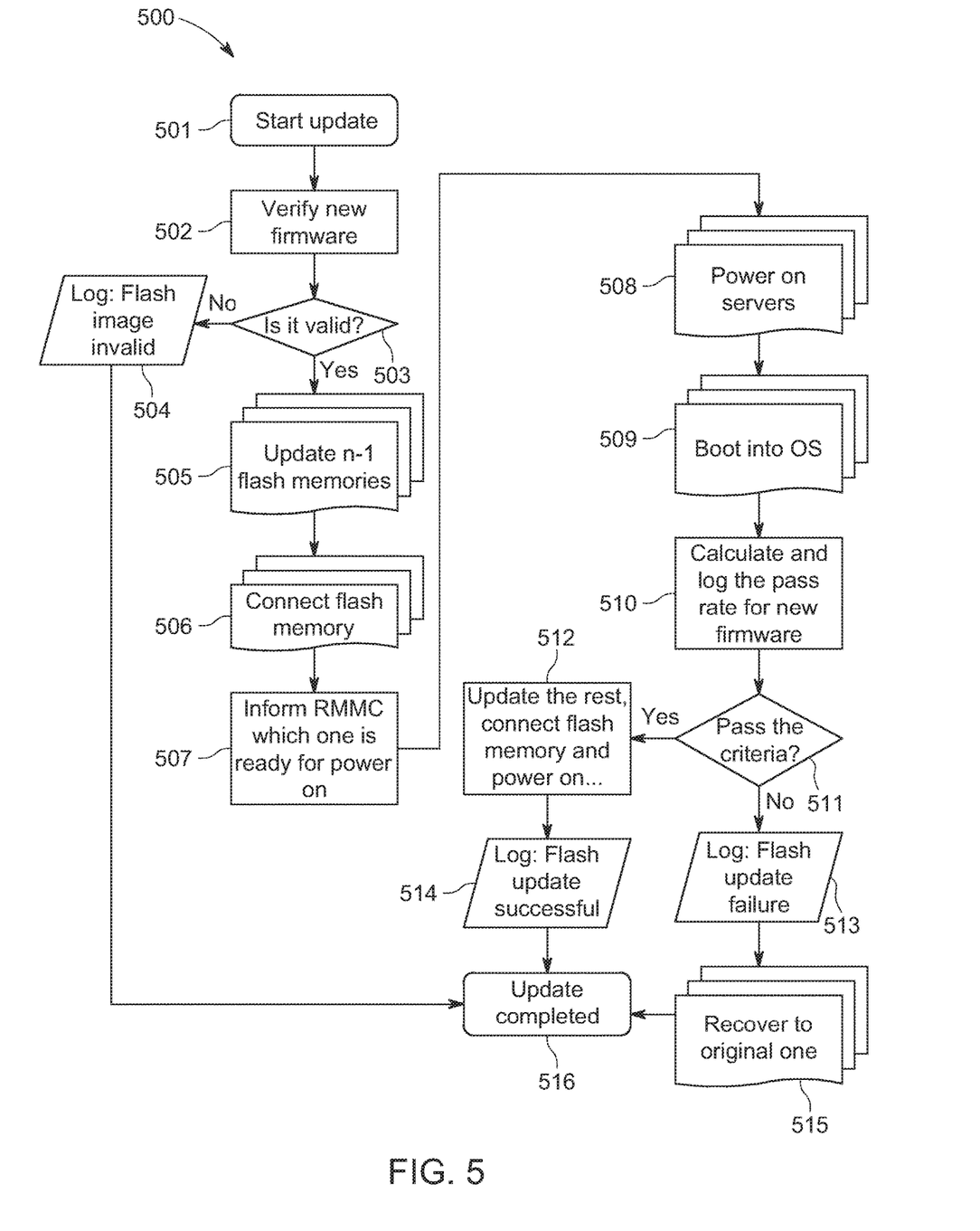
FIG. 5 is a flow chart illustrating the process of firmware update, backup and recovery, in accordance with an implementation of the disclosure.

FIG. 5 is a flow chart illustrating the process 500 of a firmware update, backup and recovery, in accordance with an implementation of the disclosure. The process 500 indicated herein is described in detail with reference to the components of the server system 200 of FIGS. 2 and 3. All firmware in the CFMM 250 can be updated through the FMMC 230 at step 501. A public key can be implemented to verify whether the new firmware image is valid at step 502. If the new firmware image is valid, the process 500 advances to step 505. If the new firmware image is invalid, the process 500 advances to step 504. At step 504, the FMMC 230 will log 'Flash Image Invalid' and exit the update process 500. At step 505, the update process will proceed.

At step 505, the flash devices (n-1) are updated first. The spare flash devices (previously designated in the topology) are preserved as golden images for recovery purposes. The updated flash devices are connected to the FMMC 230 at step 506. At step 507 the server devices 15 that are associated with the updated flash devices are ready to be power-cycled; these server devices 15 are reported to the FMMC 230. The server devices 15 are power-cycled at step 508. The firmware is BOOT into the Operating System (OS) at step 509. The pass rate for the new firmware is calculated and logged by the FMMC 230 at step 510. At step 511, the FMMC 230 determines if the pass rate is higher or lower than a predetermined criterion.

If the pass rate is lower than a predetermined criterion at step 511, the FMCC 230 will log 'Flash Update Failure' to reject the new firmware at step 513. At step 515, the FMMC 230 will revert to the original firmware automatically. The original firmware is the same as the reserved golden image. If the pass rate meets the predetermined criterion at step 511, the remaining server devices' firmware is updated at step 512. At step 514, the FMMC 230 will log 'Flash Update Successfully.' The update is completed at step 516.

Figure 6:
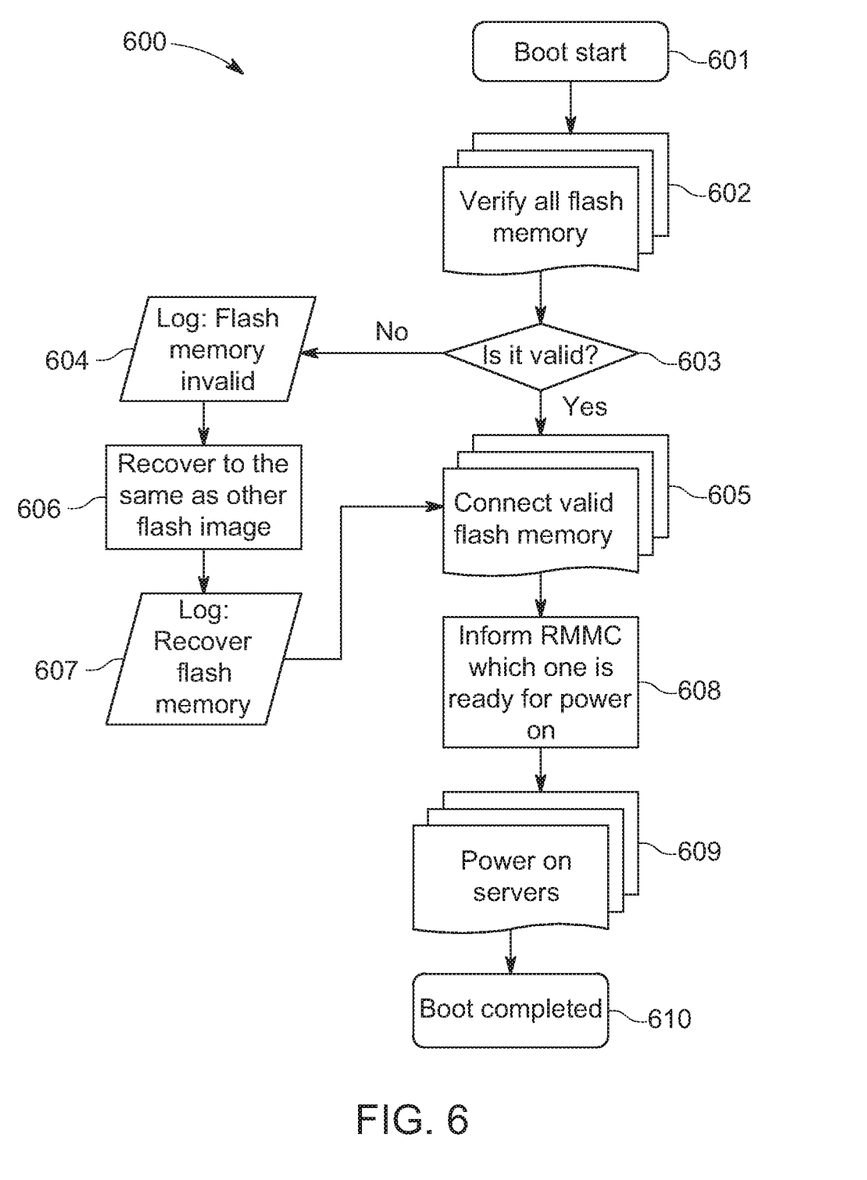
FIG. 6 is a flow chart illustrating the process of booting a server device in the server system, in accordance with an implementation of the disclosure.

FIG. 6 is a flow chart illustrating a process 600 of booting a server device in the server system, in accordance with an implementation of the disclosure. The process 600 indicated herein is described in detail with reference to the components of the server system 200 of FIGS. 2 and 3.

The process starts at 601. At step 602, the flash devices 220 can be authenticated and endorsed by the FMMC 230 before connecting to the corresponding server device 15. The flash devices 220 are also powered on. In order to establish the root of trust, the FMMC 230 is boot before other server devices 15 (in FIG. 4). The same public key is implemented to calculate the hash signature. The hash signature is compared to each hash signature within the flash devices 220 to determine if it is valid at step 603. If the hash signature is valid, the process 600 advances to step 605. If the hash signature is invalid, the process 600 advances to step 604. At step 605, the flash devices 220 are connected to the server device 15 using the FMMC 230. At step 608, the FMMC 230 is notified of which server device 15 is ready to be power cycled. The server devices 15 are power cycled at step 609. The boot is complete at step 610.

Figure 7A:
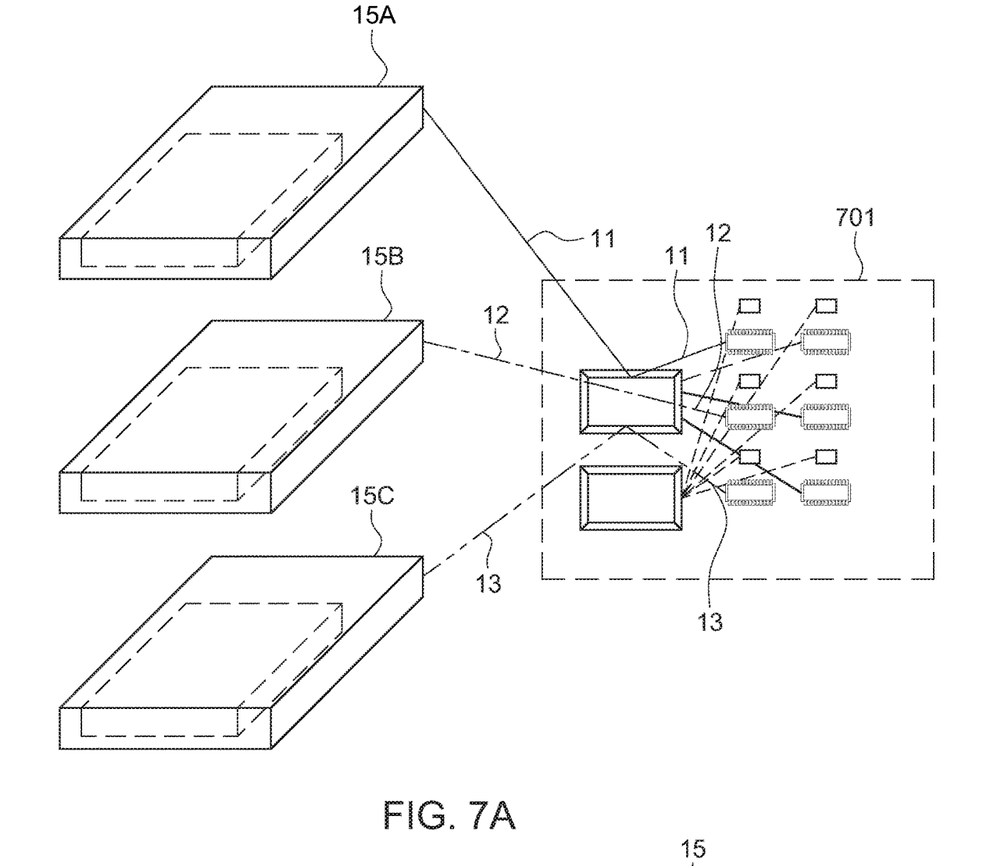
FIG. 7A illustrates visual indicators of the centralized flash memory module, in accordance with an implementation of the disclosure.

If the hash signature is invalid for the flash devices 220, the FMMC 230 will log event 'Flash memory invalid' and turn on an indicator. Referring momentarily to FIG. 7A, the CFMM 701 can include indicators associated with each flash device. In some embodiments, the indicator can include an LED device. Varying colors of the LED device can be utilized to indicate a status to a technician servicing the CFMM 701. For example, a green light can indicate the flash device is online. A green blinking light can indicate the flash device is updating. An amber blinking light can indicate the flash device is in recovery mode, and an amber light can indicate the flash device is faulty (unrecoverable).

Referring back to FIG. 6, the flash device 220 is updated to a valid image at step 606. The FMMC 230 will log event 'Recover Flash memory' and turn off the indicator at step 607. Once the recovery process is complete, the flash device 220 is connected to the server device 15 and power-cycled.

Figure 7B:
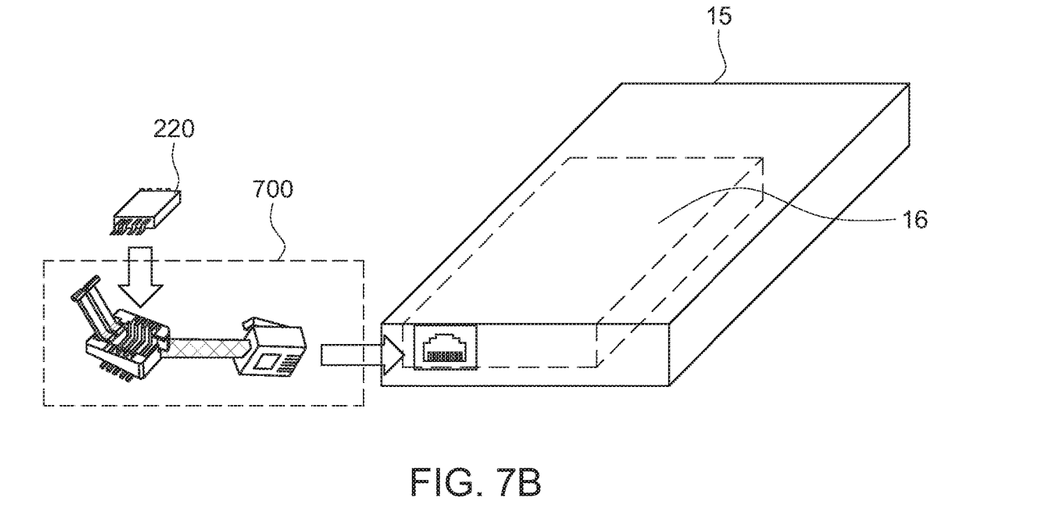
FIG. 7B illustrates a debug tool for a single server device in the server system, in accordance with an implementation of the disclosure.

FIG. 7B illustrates a debug tool for a single server device 15 in the server system, in accordance with an implementation of the disclosure. During the new product introduction (NPI) phase, a technician typically performs debugging to implement the new product. A modularized device 700 with flash device 220 can be implemented to debug a server device 15 where there is an off-line power on or repair required because the flash device 220 has been moved to CFMM (centralized flash memory module). To debug or repair the server device 15, the single flash device 220 is coupled with the modularized device 700 and connected to the motherboard 16. Modularized device 700 implements a communication interface to connect flash device 220 and server device 15 for it to boot.

While particular embodiments of the present invention have been shown and described, it will be obvious to those skilled in the relevant arts that changes and modifications may be made without departing from the invention in its broader aspects. Therefore, the aim in the appended claims is to cover all such changes and modifications that fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

The terminology used herein is for the purpose of describing particular embodiments only and is not intended to limit the invention. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

What is claimed is:

1. A centralized flash memory module comprising:
   two or more flash memory components, each of the two or more flash memory components storing Basic Input and Output System (BIOS) firmware;
   a flash memory management controller (FMMC) configured to connect to a rack management device, wherein the rack management device is separate from the centralized flash memory module within a rack device; and
   a complex programmable logic device (CPLD) configured to connect the FMMC to the two or more flash memory components and to connect the two or more flash memory components to at least one server device within the rack device, wherein the at least one server device is separate from the centralized flash memory module within the rack device.

2. The centralized flash memory module of claim 1, further comprising a non-volatile storage device configured to store a routing table that includes a topology of the two or more flash memory components and the at least one server device.

3. The centralized flash memory module of claim 2, wherein the FMMC is configured to send the routing table to the rack management device.

4. The centralized flash memory module of claim 3, wherein each of the two or more flash memory components comprises a golden image for recovery purposes.

5. The centralized flash memory module of claim 1, wherein the two or more flash memory components are not in-system writable.

6. A server system comprising:
   at least one rack device housing a plurality of server devices;
   a rack management device stored on the at least one rack device; and
   at least one centralized flash memory module separate from and connected to each of the plurality of server devices, the centralized flash memory module comprising:
   two or more flash memory components, each of the two or more flash memory components storing Basic Input and Output System (BIOS) firmware;
   a flash memory management controller (FMMC) configured to connect to the rack management device; and
   a complex programmable logic device (CPLD) configured to connect the FMMC to the two or more flash memory components and to connect the two or more flash memory components to at least one server device within the at least one rack device, wherein the at least one server device is separate from the at least one centralized flash memory module within the rack device.

7. The server system of claim 6, wherein the centralized flash memory module is located on the at least one rack device.

8. The server system of claim 6, the centralized flash memory module further comprising a non-volatile storage device configured to store a routing table that includes a topology of the two or more flash components and the at least one server device.

9. The server system of claim 8, wherein the FMMC is configured to send the routing table to the rack management device.

10. The server system of claim 6, wherein each of the two or more flash memory components comprises a golden image for recovery purposes.

11. The server system of claim 6, wherein the centralized flash memory module is located in a cloud based server device.

12. The server system of claim 11, wherein at least one of the two or more flash memory components comprises a golden image for recovery purposes for two or more of the at least one rack device.

13. A method of updating a flash Basic Input and Output System (BIOS) firmware image of two or more flash memory components, the method comprising:
   validating the flash BIOS firmware image;
   updating a first flash BIOS firmware image of a first one of the two or more flash memory components to replace a the first flash BIOS firmware image with the validated flash BIOS firmware image, the two or more flash memory components are stored in a centralized flash memory module;
   upon determining success of the first updating, updating a second flash BIOS firmware image of a second one of the two or more flash memory components to replace a the second flash BIOS firmware image with the validated flash BIOS firmware image, the second flash BIOS firmware image is associated with a golden flash BIOS image;
   identifying, using a flash memory management controller, at least one flash memory component that successfully replaced the second flash BIOS firmware image; and
   powering on at least one server device connected to the at least one flash memory component stored in the centralized flash memory module.

* * * * *